United States Patent [19]

Bale

[11] 4,275,618
[45] Jun. 30, 1981

[54] CONTROL DEVICE FOR MOTOR ROAD VEHICLE AUTOMATIC CHANGE-SPEED TRANSMISSION MECHANISM

[75] Inventor: Alain Bale, Le Mans, France

[73] Assignee: C.B.M. Car et Bus Le Mans, Le Mans, France

[21] Appl. No.: 104,902

[22] Filed: Dec. 18, 1979

[30] Foreign Application Priority Data

Jan. 4, 1979 [FR] France .................. 79 00141

[51] Int. Cl.³ .................. B60K 41/06; B60K 20/08
[52] U.S. Cl. .................. 74/878; 74/473 R; 74/483 PB; 74/477; 74/861
[58] Field of Search .............. 74/878, 473 R, 483 PB, 74/843, 856, 861, 477

[56] References Cited

U.S. PATENT DOCUMENTS

| 2,244,092 | 6/1941 | Wheeler | 74/483 PB |
|---|---|---|---|
| 2,824,459 | 2/1958 | Thibodeau | 74/483 PB |
| 2,897,685 | 8/1959 | Thannhauser | 74/473 |
| 2,910,885 | 11/1959 | Bevacqua | 74/483 PB |
| 2,924,124 | 2/1960 | Froslie | 74/483 PB |
| 2,939,447 | 6/1960 | Lucas et al. | 74/473 X |
| 2,989,958 | 6/1961 | Scharfenberg | 74/483PB |
| 3,001,618 | 9/1961 | McCordic et al. | 74/483 PB X |
| 3,068,717 | 12/1962 | Meli et al. | 74/483 PB |
| 3,084,563 | 4/1963 | Fischer | 74/483 PB |
| 3,141,350 | 7/1964 | Bevacqua et al. | 74/483 PB |

FOREIGN PATENT DOCUMENTS 2429357   2/1980   France ..................... 74/878

*Primary Examiner*—Leslie Braun
*Attorney, Agent, or Firm*—Michael J. Striker

[57] ABSTRACT

This control device for automatic change-speed transmission mechanism of motor road vehicles has a control keyboard of which the keys control the energization of switches cooperating with cam faces formed on an axially movable detector shaft the translation of which is controlled by means of a rotary cam rigid with the selector shaft of the change-speed mechanism, this cam comprising an integral radial arm responsive to a double-acting pneumatic cylinder responsive in turn to a pair of solenoid valves adapted to be energized for moving the piston of the pneumatic cylinder in one or the other direction as a function of the specific key depressed by the driver in order to provide the desired range of speed ratios, or the neutral position, or the reverse gear.

9 Claims, 6 Drawing Figures

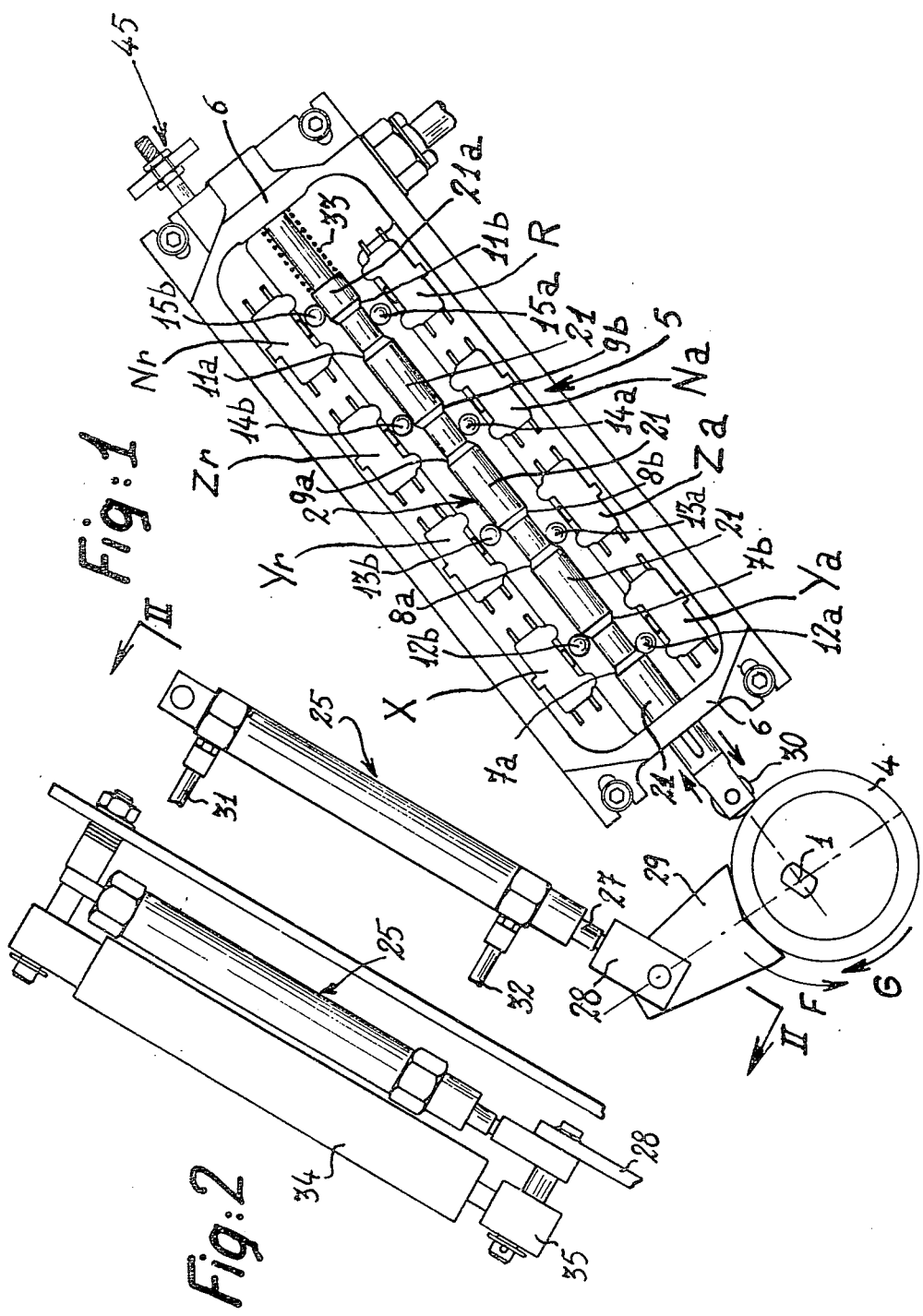

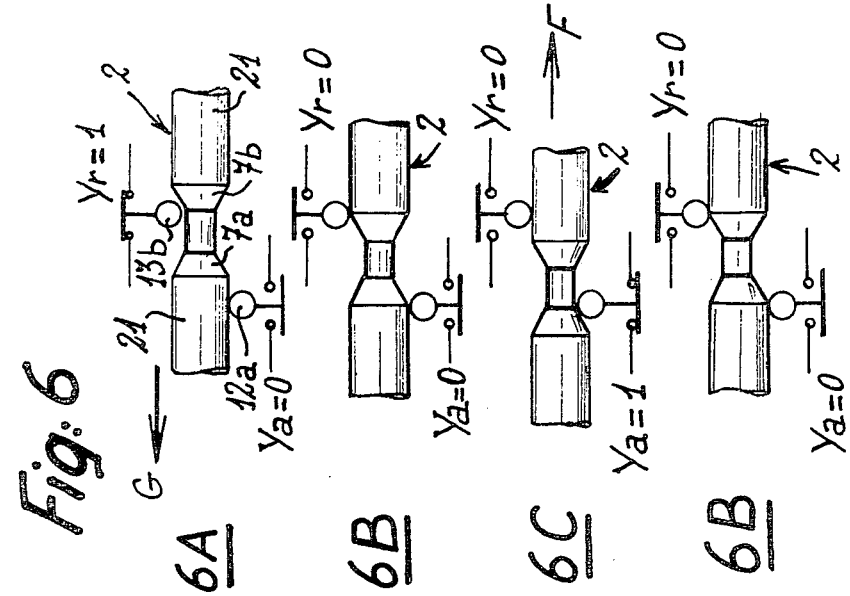
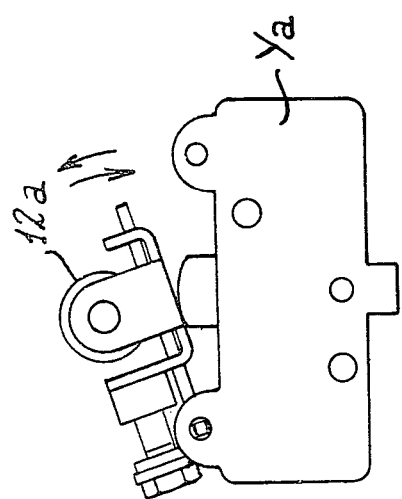
Fig. 6
Fig. 4
Fig. 5

CONTROL DEVICE FOR MOTOR ROAD VEHICLE AUTOMATIC CHANGE-SPEED TRANSMISSION MECHANISM

BACKGROUND OF THE INVENTION

1. Field of the Invention

This invention relates to control systems for automatic change-speed transmissions or gearboxes of motor road vehicles, notably heavy commercial vehicles and more particularly motor buses and coaches.

2. Description of the Prior Art

In a first known control device of this kind, a cable and linkage arrangement is adapted to be actuated by means of a lever mounted on the instrument panel of the vehicle and coupled to a selector shaft mounted on the gearbox. However, in actual practice the drivers, especially in the case of a passenger-buses or coaches, experienced some difficulties in operating this type of control device.

In a second known construction the automatic change-speed transmission is controlled through hydro-electronic means comprising essentially an electronic control box coupled on the one hand to the change-speed mechanism or gearbox and on the other hand to a selector keyboard provided with several keys and fitted to the instrument panel within easy reach of the driver's hand.

Now this last-mentioned device is complicated, expensive and a constant source of trouble.

SUMMARY OF THE INVENTION

It is the primary object of the present invention to provide a more economical and less complicated control device for change-speed transmission mechanisms or gearboxes which can be actuated from a keyboard-type control unit the operation of which by the driver is considerably more convenient than the conventional pivoted lever.

For this purpose, the control device of this invention comprises essentially a detector shaft for detecting the positions assigned to the selector shaft, said detector shaft being adapted to be moved for axial translation by means of electro-pneumatic means comprising a control keyboard disposed on the instrument panel of the vehicle, and a rotary cam rigid with the selector shaft and cooperating on the one hand with said position detector shaft and on the other hand with said electro-pneumatic control means, so that when the driver depresses a key or push-button of said control keyboard the electro-pneumatic means are actuated in order to shift the detector shaft, the selector cam and the selector shaft rigid therewith to a position giving automatically the desired range of gear ratios.

The control keyboard comprises a series of push-buttons or keys corresponding to the various ranges of gear ratios contemplated, as well as a "Neutral" key and a "Reverse" key. Thus, by merely depressing one of these keys, the electro-pneumatic means will be actuated and move the detector shaft to the position corresponding to the depressed key, the axial movement of this detector shaft being attended correlatively by a pivotal movement of the selector shaft to the desired position through the intermediary of the rotary cam rigid with this selector shaft.

In a preferred form of embodiment of the control device of this invention the detector shaft has formed on its outer surface a plurality of cam faces associated with an equal number of corresponding electric switches connected on the one hand to the keys of the control keyboard and on the other hand to a pneumatic circuit controlling the rotary cam rigid with the selector shaft, each predetermined position of the detector shaft and of the cam faces formed thereon in relation to the set of electric switches corresponding to a predetermined position of said cam and selector shaft assembly.

In a typical form of embodiment of the detector shaft, the cam faces formed thereon consist of frustoconical sections coaxial with the shaft and disposed by pairs with alternate inclinations, each switch associated with a given cam face being in elastic contact therewith when closed and in elastic contact with a shaft land portion located beyond the corresponding cam face when open.

Thus, through the position detector shaft and the pneumatic circuit associated therewith a positioning servo-action is obtained which is capable of setting the rotary cam in the angular position corresponding to the range of gear ratios selected by means of the keyboard mounted on the instrument panel.

Other features and advantages of this invention will appear as the following description proceeds with reference to the accompanying drawings given by way of illustration, not of limitation, showing diagrammatically a typical form of embodiment of the control device according to this invention for a motor road vehicle automatic change-speed transmission.

BRIEF DESCRIPTION OF THE DRAWINGS

FIG. 1 is an elevational view with parts broken away, showing the positions assigned to the selector shaft, the rotary cam associated therewith and a cylinder and piston unit incorporated in the pneumatic control circuit;

FIG. 2 is a fragmentary elevational view taken in the direction of the arrows II—II of FIG. 1, showing the pneumatic cylinder and piston unit and a damper associated therewith;

FIG. 4 is a detail elevational view showing on a larger scale one of electric switches cooperating with the detector shaft;

FIG. 5 is a table showing diagrammatically the various possible relative positions of the electric switches and detector shaft cam faces, for each one of the ranges of gear ratios controllable from the control keyboard, and FIG. 6 illustrates at 6A, 6B, 6C the mode of operation of the detector shaft as a function of the angular positions given to the selector shaft, in the case of a pair of switches associated therewith.

DESCRIPTION OF THE PREFERRED EMBODIMENT

Figure 3:
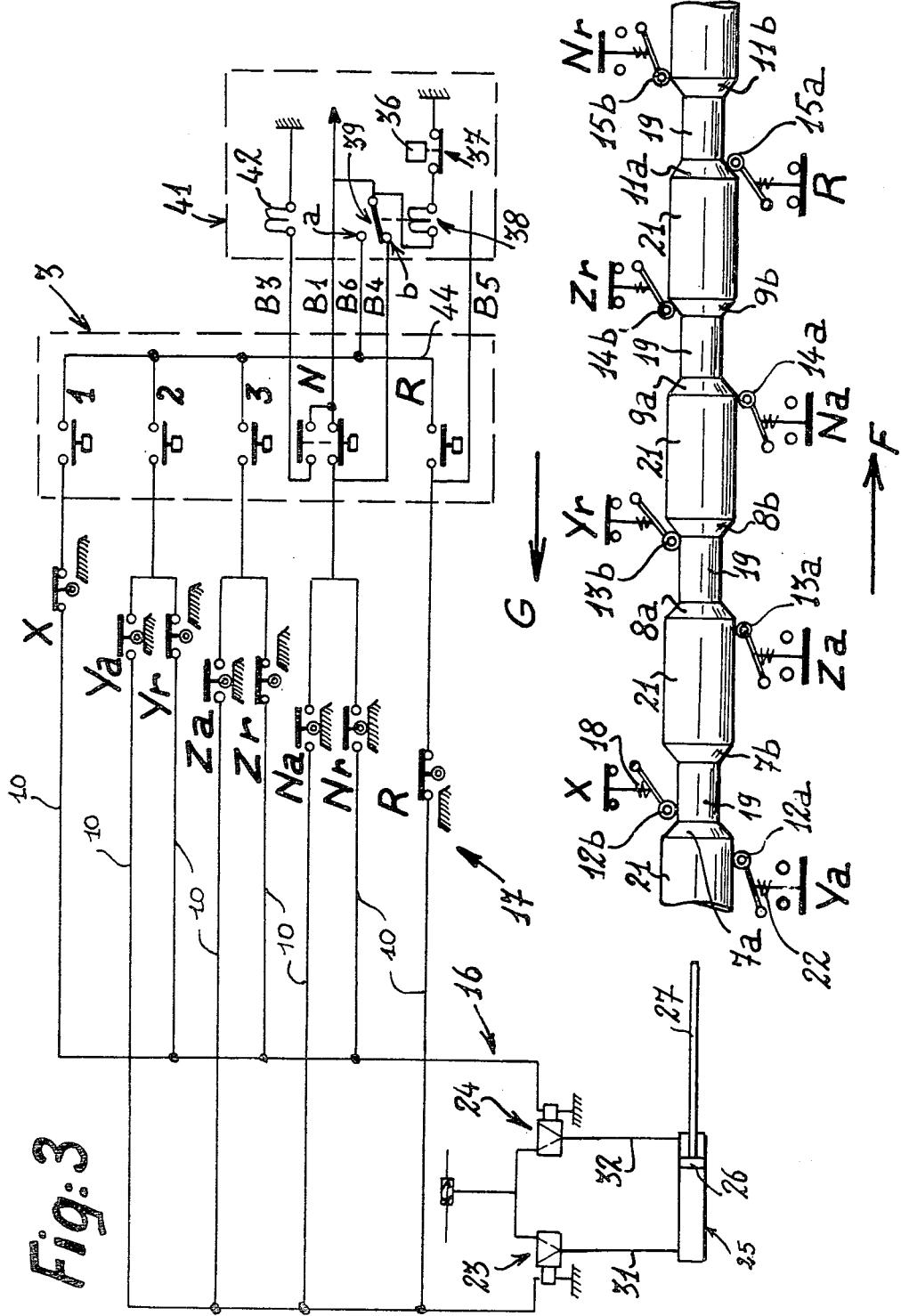
FIG. 3 is a diagram illustrating the general arrangement of the electro-pneumatic circuit means of the control device according to this invention, together with one portion of the detector shaft responsive to this electro-pneumatic circuit.

The control device for motor road vehicle automatic change-speed transmission or gearbox illustrated in FIGS. 1 to 4 of the drawings is adaptable to all gearboxes or change-speed mechanisms having a rotary selector shaft, on motorbuses, coaches and passenger automobiles.

This device comprises a gear selector shaft 1 rotatably mounted on a gearbox or change-gear transmission mechanism (not shown), detector shaft 2 for detecting the angular positions assigned to said selector shaft 1, and adapted to be moved by translation in its axial direction, in one or the other direction, by electro-pneumatic means illustrated diagrammatically in FIG. 3, which comprise a control keyboard 3 disposed on the instrument panel of the vehicle and provided with a plurality of control keys in the form of push-buttons.

The control device according to the instant invention further comprises a rotary cam 4 rigid with the selector shaft 1. This cam 4 has a circular contour and the shaft 1 is secured eccentrically to the cam 4, as shown. This rotary cam 4 cooperates on the one hand with the detector shaft 2 and on the other hand with the above-mentioned electro-pneumatic means, so that to the depression of a key of control keyboard 3 there corresponds an order delivered to the electro-pneumatic means for moving the detector shaft 2 and the cam 4 associated therewith to a position determining the desired or selected range of gear ratios.

In the form of embodiment illustrated, the device comprises a detector shaft 2 mounted for axial movement in an elongated case 5 and projecting from the case ends 6; this detector shaft 2 has formed on its outer periphery a plurality of spaced cam faces 7a, 7b, 8a, 8b ... 11a, 11h associated with an equal number of corresponding electric switches 12a, 12b, 13a, 13b, ... 15a, 15b, connected to a pneumatic circuit designated in general by the reference number 16 in FIG. 3, which controls the rotary cam 4 and the selector shaft 1. The pneumatic circuit 16 itself is controllable by means of said keyboard 3 by means of a bundle 17 of electric wires 10 in which the aforesaid switches are inserted. Now the specific structure of detector shaft 2, cam 4 and switches 12a, 12b, ... 15a, 15b, will be described in detail. The pneumatic system controlled from the keyboard 3 via said switches will be described presently.

DETECTOR SHAFT AND ELECTRIC SWITCHES ASSOCIATED THEREWITH

The cam faces 7a, 7b ... of detector shaft 2 consist of frustoconical sections formed coaxially on this shaft and disposed by pairs so that the two cam faces of a same pair have opposite or alternate inclinations; each switch such as 12a ... 15b associated with a given cam face is pressed resiliently thereagainst when closed, and against a land 21 of detector shaft 2 which is adjacent the corresponding cam face when open. The two possible positions that each electric switch or microswitch can assume are clearly shown in FIGS. 1 and 3.

Notably in FIG. 3 it is clear that the switch or microswitch X is closed when its movable member 12b (urged by a return spring or like resilient means 18) engages a stem portion 19 of shaft 2 extending between the two frustoconical cam faces 7a and 7b, this stem portion 19 having a smaller diameter than the lands 21 extending between two adjacent pairs of cam faces, for example pairs 7a, 7b and 8a, 8b.

In contrast thereto, the movable member 12a of switch or microswitch Ya engages a land 21 of shaft 2, so that this movable member 12a can open said switch Ya under the influence of a return spring 22 associated therewith.

Therefore, to each axial position assumed by the detector shaft 2 during its movement of translation there corresponds a predetermined set of positions of the various switches associated with the cam faces, said switches being either open or closed as a function of the position of their movable member in relation to the corresponding cam faces. In the exemplary form of embodiment illustrated, the detector shaft 2 comprises four pairs of cam faces such as 7a, 7b, etc. cooperating with eight switches or microswitches X, Yr, Zr, Nr, Ya, Za, Na and R.

This set of switches is connected via electric wires 10 to the electropneumatic circuit 16 so that the latter can be properly and selectively energized as a function of orders transmitted to said switches by means of the control keyboard 3. In the form of embodiment illustrated, this keyboard 3 comprises five keys or push-buttons, i.e. a key 1 corresponding to the first and second gear ratios, so that when this key 1 is depressed the vehicle will be driven automatically firstly in low gear and then in second gear; a second key 2 for starting the vehicle from rest in the low or first gear and subsequently shifting from low gear to second gear and then to third gear; a third key 3 controlling the successive engagement of the first, second, third and fourth gears. Another key denoted N corresponds as customary to the neutral, and likewise key R corresponds to the reverse drive.

Thus, the operation of the position detector consisting of shaft 2 mounted in case 5 is based on the use of two microswitches or switches Ya, Yr, etc. ... for each position of detector shaft 1, except the endmost positions 1 and R, by taking advantage of their differential strokes with respect to the cam faces formed on detector shaft 2.

ELECTRO-PNEUMATIC CONTROL CIRCUIT

Each pair of switches associated with a given key of keyboard 3 is shown in the electric circuit 17 connecting this keyboard 3 to the pneumatic circuit 16 (FIG. 3). Thus, key 1 controls switch X, key 2 controls switching Ya and Yr, key 3 controls the pair of switches Za and Zr, key N (Neutral) controls the pair of switches Na and Nr, and key R (Reverse) controls switch R.

It is clearly apparent that when the driver depresses key N, the corresponding switches Na and Nr are opened, one switch of each pair controlling the movement of detector shaft 2 in one direction via pneumatic circuit 16 while the other switch of each pair controls the movement of shaft 2 in the opposite direction.

Each key 2, 3 N of keyboard 3 is connected to the relevant pair of switches connected in turn to a pair of solenoid valves 23, 24 controlling the double-acting pneumatic cylinder-and-piston unit 25.

Cylinder 25 is provided with a piston 26 of which the rod 27 carries at its outer end a fork 28 pivotally connected to an arm 29 rigid with cam 4.

The solenoid valve 23 is connected to the pneumatic cylinder 25 by means of an air injection pipe line 31 leading to the cylinder end remotest from lever 29, and solenoid valve 24 is connected to the opposite end of cylinder 25 by means of another pipe line 32. Thus, when the solenoid valve 23 is energized as a consequence of a control order transmitted from keyboard 3, it delivers compressed air into cylinder 25 so that the piston 26 and piston rod 27 thereof are moved outwards and cause the arm 29, cam 4 and selector shaft 1 to pivot in the counter-clockwise direction (see arrow F, FIG. 1). When on the other hand the other solenoid valve 24 is energized, the air injected through pipe line 32 into cylinder 25 moves the piston 26 and its rod 27 inwards and causes the arm 29, cam 4 and selector shaft 1 to pivot in the clockwise direction (arrow G), this movement being attended by corresponding axial movements in one and the other direction of detector shaft 2.

The connections provided between keys 1, 2, 3, N, R of keyboard 3 and the solenoid valves 23, 24 are as follows:

key 1 is connected to switch X connected in turn to solenoid valve 24. When this key 1 is inoperative, switch X is closed and its movable member 12b is urged resiliently between the cam faces 7a and 7b, i.e. against the stem portion 19, of minor diameter, of detector shaft 2, as shown in FIG. 3.

key 2 is connected to miniswitches or switches Ya and Yr, of which Ya is connected to solenoid valve 23 while Yr is connected to solenoid valve 24. When key 2 is inoperative, Ya is open and Yr is closed. In fact, in this case switch Ya is so located in relation to detector shaft 2 that its movable member 12a bears against one of the lands 21, of maximal diameter, of shaft 2, so that switch Ya is opened by means of resilient member 22.

key 3 is connected to switches Za and Zr, connected in turn and respectively to solenoid valves 23 and 24. When key 3 is inoperative, Za is open and when Zr is closed, their movable contact member cooperating with the detector shaft 2 having the same positions as those of the two switches associated with key 2.

the neutral key "N" is connected to switches Na and Nr connected in turn to solenoid valves 23 and 24. These two switches are open when key N is depressed, as illustrated in FIG. 1.

key R is connected to switch R connected in turn to solenoid valve 23. When this key R is inoperative, switch R is closed.

The detector shaft 2 is provided at one end with a rotary roller follower 30 engaging the outer periphery of cam 4 and urged for contact therewith by a resilient member 33 surrounding the opposite end of shaft 2 and reacting against the bottom 6 of case 5. In the example illustrated and described herein, this resilient member consists of a coil compression spring 33 disposed coaxially to shaft 2 between the end shoulder of land 21a and the bottom 6 of case 5, that is, around the end of shaft 2 opposite roller 30.

On the other hand, cooperating with the pneumatic cylinder unit 25 is a damper 34, according to the known fashion, whereby the position of cam 4 as a consequence of the movements imparted thereto by this cylinder 25 can be controlled very accurately. This damper 34 is filled with a suitable hydraulic fluid and encloses a piston having the outer end of its rod connected to the end fork 28 by means of a coupling member 35 (FIG. 2). The reciprocating movements of rod 27 and fork 28 are thus damped by the intermediate coupling member 35 of damper 34, the latter also serving the purpose of holding the assembly comprising the rod 27, arm 29, cam 4, selector shaft 1 and detector shaft 2 in the selected position.

Now reference will be made more particularly to FIG. 3 for describing complementary means intended according to this invention for automatically restoring the change-speed transmission or gearbox to neutral, as normally obtained by depressing the key "N", in case the driver forgot to switch off or stop the engine by so depressing this key.

In the form of embodiment shown diagrammatically in FIG. 3 these complementary means comprise a hydraulic pressure-responsive switch 36 associated with an electric contact 37 normally held open by the hydraulic pressure prevailing in this pressure responsive switch 36 when the engine is running, against the force of a resilient member, not shown. Contact 37 is connected in series with a relay 38 connected in turn to a tumbler switch 39 adapted to be set in two positions, i.e. a first safety position a corresponding to the neutral condition of the transmission mechanism and a second position b in which tumbler switch 39 closes the electric connection between the storage battery of the vehicle and a line B4 leading to a junction point between the neutral "N" and the corresponding miniswitches Na and Nr.

This safety system operates as follows: assuming that the driver stops the engine but forgets to depress the push-button "N", the hydraulic pressure in the pressure-responsive switch 36 drops and eventually becomes insufficient for keeping switch 37 open, so that the latter is closed by its resilient means. Thus, relay 38 is energized and switch 39 is moved to position b, and current is supplied to line B4 and opens the pair of miniswitches Na and Nr. Thus, the change-speed gear or transmission mechanism of the vehicle is restored automatically to its "Neutral" condition without depressing the "N" or neutral key.

The above-described safety system is enclosed in an electric box 41 also containing the various other electrical components, inter alia a starting relay 42 connected via a line B3 to key N, another line B1 also connected to key N, a line B6 connecting the fixed contact a of switch 39 to the line 44 supplying current to the complete set of pushbuttons of keyboard 3, and finally a line B5 connecting the reverse key R to the back-up lights or reversing lamps of the vehicle.

It should also be noted that the positions of the miniswitches enclosed in case 5 are adjustable in relation to detector shaft 2 by means of an adjustment member 45 disposed externally of the case.

The control device described hereinabove operates as follows:

Firstly, the principle of operation of the shaft 2 for detecting the angular positions assigned to selector shaft 1 will be explained with reference to the diagram of FIG. 6.

In this diagram, the various possible conditions 6A, 6B, 6C of a pair of microswitches associated with cam faces 7a, 7b are shown. To clarify the description, it is assumed that the microswitch located on the left-hand side of microswitch Yr is microswitch Ya, in contrast to the arrangment of FIGS. 1 and 3 in which these two microswitches are separated by microswitches X and Za.

In condition 6A, microswitch Yr is closed, its movable member 13b engaging the stem 19 of shaft 2 and being in state 1. In contrast thereto, miniswitch Ya is open, its movable member 12a engaging a land 21 of larger diameter, and this miniswitch Ya is in state 0.

Now if the driver wants to obtain position "Y" by depressing the corresponding key, $Y_r$ being closed, the electro-pneumatic circuit 16, 17 will control the backward movement of the piston of cylinder 25, so that cam 4 will move in the direction of the arrow G. When $Yr=0$, i.e. when Yr is open, its movable member having moved up the corresponding cam face 7b, the stroke of the piston in cylinder 25 is stopped as a consequence of the deenergization of solenoid valve 24, which stops the supply of compressed air to the cylinder, so that position "Y" is obtained, as illustrated diagrammatically in state 6B. At that time, Yr=0, and Ya=0. In fact, the movement accomplished by shaft 2 is not sufficient to close miniswitch Ya.

This is obvious when one observes the various components in FIG. 1 illustrating the actual position.

Now, if the initial condition is that shown at 6C (FIG. 6), wherein miniswitch Yr is open and in state 0, miniswitch Ya is closed and in state 1, its movable member being against the stem portion 19 at the base of cam face 7a, and assuming the driver wants to obtain position Y, so that Ya is closed, the system operates as follows: Cylinder 25 moves cam 4 in the direction of the arrow F, and when Ya=0 (position 6B, FIG. 6), the piston in cylinder 25 is stopped while Yr is still in state 0. Thus, the system is in position Y.

Therefore, the operation of couple Ya and Yr can be summarized by means of the following phase table:

|  | $Y_a$ | $Y_r$ |
| --- | --- | --- |
| State 1 (6A) | 0 | 1 |
| Position Y (6B) | 0 | 0 |
| State 2 (6C) | 1 | 0 |

Finally, for the complete set of miniswitches or contacts X, Ya, etc. . . . and the corresponding keys 1, 2, 3, N, R, the general phase table illustrated in FIG. 5 is obtained.

The general mode of operation of the control device of this invention is as follows: Firstly, the engine cannot be started unless the key N is depressed beforehand. Therefore, when the driver has depressed this key N, he subsequently depresses one of keys 1, 2, 3 and R. If for instance the driver depresses key 2, current will flow through the now closed switch Yr, thus energizing the solenoid valve 24. Therefore, air is delivered via pipe line 32 to cylinder 25, so that piston 26 and it rod 27 are moved to rotate the arm 29, cam 4 and selector shaft 1 in the clockwise direction G, to perform a return stroke. The detector shaft 2 is moved accordingly in the direction corresponding to this clockwise rotation of cam 4, until Yr is opened (state 0). Then switch Yr opens the circuit through which the solenoid was energized and the corresponding valve stops supplying air to cylinder 25, so that the latter comes to a standstill, i.e. in a waiting position, together with arm 29, cam 4, selector shaft 1 and detector shaft 2.

Thus, gear 2 is engaged.

This device operates in the same fashion when the other pushbuttons are depressed, with the only difference that the end keys 1 and R energize only one switch each.

The detector shaft 2 is properly pre-adjusted by means of the external adjustment screw 45 in order to set the relative strokes of The switch movable members and of their corresonding cam faces.

To simplify its manufacture, the rotary cam 4 has a circular profile having its centre off-set in relation to the axis of selector shaft 1.

In the gearbox or change-speed transmission mechanism each position assumed by the selector shaft 1 is locked relatively firmly due to the provision of damper 34 controlling the movements of piston rod 27 of pneumatic cylinder 25, in order to impart a reliable efficiency to the control device of the invention.

On the other hand, as explained hereinabove, the safety system mounted in the electric control box 41 is adapted to restore automatically the gearbox in its neutral state N in case the driver switched the engine ignition system off and forgot to depress push-button N.

The use of the control device according to this invention is particulary convenient for the driver of a bus or coach, due to the provision of the keyboard 3.

This control device is applicable not only to all change-speed transmission mechanisms or gearboxes provided with a rotary selector member as illustrated by way of example in the drawings, but also to change-speed mechanisms of which the selector shaft consists of, or is provided with, a slide-type control member movable in translation. In this case, the double-acting pneumatic cylinder causes the slide member to move concomitantly with the selector shaft. In general the control device according to this invention can be mounted on any change-speed transmission mechanism or gearbox in which the gear selection is accomplished by causing a movement of rotation or translation of any suitable member.

This invention is also applicable to mechanical gearboxes, notably of the type used in public works machines, cranes, and the like.

Of course, this invention should not be construed as being strictly limited by the specific form of embodiment described and illustrated herein, since many modifications and changes may be brought thereto without departing from the basic principles of the invention. Thus, the speed range may differ from the one contemplated hereinabove, which comprises only five positions. In fact, these five positions are particularly adequate for town vehicles such as motorbuses, in which it may be preferable not to indulge in the lowest gear. As a matter of fact, in the case of an ordinary passenger-car, the speed range may comprise preferably six positions, namely a first position 1 in which only the low or first gear is engaged and maintained, a position 2 in which the vehicle is started from rest in low gear and then changes to second gear, a position 3 in which the vehicle is started in low or first gear, then changes to second gear and eventually to third gear, a position 4 in which the vehicle is started in low gear, the change occuring subsequently from low gear to second gear, then from second to third gear, and finally from third to fourth or top gear, a neutral position N and a reverse position R.

In the case of a six-position change-speed mechanism, the corresponding keyboard should of course comprise six keys with an additional pair of switches, the operation being otherwise identical with that of the form of embodiment disclosed hereinabove.

What is claimed is:

1. A motor road vehicle automatic change-speed transmission mechanism control device comprising means for pivoting a gear selector shaft in order to bring said gear selector shaft to various positions corresponding to a selected range of gear ratios, wherein said means comprise a shaft for detecting the positions assigned to said selector shaft, electro-pneumatic means for controllably moving said detector shaft to the desired position, a control keyboard adapted to be mounted on the instrument panel of the vehicle, a rotary cam rigid with said selector shaft and adapted to engage with its profile one end of said detector shaft, a radial arm rigid with said cam and operatively connected to said electro-pneumatic means, whereby when a key of said control keyboard is depressed said electropneumatic means are actuated so as to move said detector shaft in translation, said cam and said selector shaft for pivotal movement to a position determining the operation of the mechanism through the selected range of gear ratios.

2. Automatic change-speed transmission mechanism control device as recited in claim 1, wherein said detector shaft has formed thereon a plurality of cam faces associated with an equal number of electric switches connected on the one hand to the keys of said control keyboard and on the other hand to a pneumatic circuit controlling said rotary cam and consequently said selector shaft, each predetermined position of said detector shaft and of the cam faces thereof in relation to the assembly of electric switches corresponding to a position of said rotary cam and selector shaft.

3. Automatic change-speed transmission mechanism control device as recited in claim 2, wherein said cam faces comprises coaxial frustoconical surface portions of said selector shaft which are assembled by pairs with alternate inclinations and resilient means for urging each switch against the relevant cam face in the closed condition of the switch and against a land external to said cam face in the open condition of said switch.

4. Automatic change-speed transmission mechanism control device as recited in claim 3, wherein to each range of gear ratios associated with a specific key of said control keyboard there corresponds a specific position of said detector shaft together with two switches and two cam faces, except for the endmost positions corresponding to the lowest gear and reverse gear, one switch of each pair being adapted to control said detector shaft in one direction via said pneumatic circuit, the other switch of the pair being adapted to control the movement of said detector shaft in the opposite direction.

5. Automatic change-speed transmission mechanism control device as recited in claim 4, wherein said pneumatic circuit comprises solenoid valves connected on the one hand to said control keyboard and on the other hand to a doubleacting pneumatic cylinder operatively connected to said cam so as to rotate said cam by means of said radial arm rigid therewith, said solenoid valves controlling the movements of the piston of said cylinder in one or the other direction as a function of the orders transmitted through said switches which are subordinate in turn to the positions of said switches in relation to the relevant cam faces.

6. Automatic change-speed transmission mechanism control device as recited in claim 5, wherein said keyboard comprises a series of keys corresponding to the various ranges of speed ratios and to the neutral position, means being provided for automatically restoring the change-speed transmission mechanism to its neutral condition corresponding to the depression of said neutral key in case the driver had switched the engine off without depressing said neutral key.

7. Automatic change-speed transmission mechanism control device as recited in claim 6, wherein said means for automatically restoring the transmission mechanism to its neutral condition comprise a hydraulic pressure-responsive switch associated with an electric contact normally held open by the hydraulic pressure and with resilient means for returning said switch to its closed position when the engine is switched off, a relay coupled in series with said electric contact and adapted to be energized when said electric contact is closed, and a tumbler switch adapted, when said relay is energized, to assume a position causing electric current to flow through the connections associated with said neutral key, thus restoring automatically the change-speed transmission mechanism to its neutral condition even if said neutral key had not been actuated beforehand by the driver.

8. Automatic change-speed transmission mechanism control device as recited in claim 7, wherein said detector shaft carries at one end a roller follower constantly urged by resilient means against said cam profile, said resilient means engaging said detector shaft while reacting against a fixed part of the case enclosing said detector shaft.

9. Automatic change-speed transmission mechanism control device as recited in claim 8, wherein a damper is associated with said pneumatic cylinder.

* * * * *